United States Patent
Ginis et al.

(10) Patent No.: US 7,499,487 B2
(45) Date of Patent: Mar. 3, 2009

(54) SYSTEM AND METHOD TO MITIGATE INTERFERENCE IN DSL SYSTEMS

(75) Inventors: Georgios Ginis, San Francisco, CA (US); Chia-Ning Peng, Fremont, CA (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 11/290,850

(22) Filed: Nov. 30, 2005

(65) Prior Publication Data

US 2006/0114977 A1 Jun. 1, 2006

(51) Int. Cl.
*H04L 5/16* (2006.01)
*H04D 1/04* (2006.01)
*H04J 3/10* (2006.01)

(52) U.S. Cl. .................... 375/222; 375/346; 370/201

(58) Field of Classification Search ............. 375/222, 375/224, 285, 257, 346; 370/201, 526
See application file for complete search history.

(56) References Cited

U.S. PATENT DOCUMENTS

| 6,894,989 B1 * | 5/2005 | Chadha et al. ............. 370/289 |
| 7,042,934 B2 * | 5/2006 | Zamir ...................... 375/222 |
| 2005/0053097 A1 * | 3/2005 | Djokovic et al. ........... 370/497 |
| 2005/0195892 A1 * | 9/2005 | Ginis et al. ................ 375/222 |

OTHER PUBLICATIONS

Georg Taubock, et al., "MIMO Systems in the Subscriber-Line Network", 5th International OFDM-Workshop, Sep. 2000, Hamburg, pp. 18-1 through 18-3.
Raphael Cendrillon, et al., "Parial Crosstalk Precompensation in Downstream VDSL", www.ElsevierComputerScience.com, Signal Processing, Apr. 22, 2004, pp. 2005-2019.
Raphael Cendrillon, et al., "Partial Crosstalk Cancellation for Upstream VDSL", EURASIP Journal on applied Signal Processing, Oct. 2004, Hindawi Publishing Corporation, pp. 1520-1535.
Raphael Cendrillon, et al., "Improved Linear Crosstalk Precompensation for DSL", Proceedings of IEEE Speech and Signal Processing (ICASSP) vol. 4, pp. 1053-1056, May 2004.
T. Magesacher, et al., "On the Capacity of the Copper Cable Channel Using the Common Mode", Telecommunications Research Center Vienna (ftw.), Nov. 2002.
R. Cendrillon, et al., "Partial Crosstalk Cancellation Exploiting Lina and Tone Selection in VDSL", *Proceedings of Sixth Baiona Workshop on Signal Processing in Communications*, Spain, Sep. 2003.
Raphael Cendrillon, et al., "The Linear Zero-Forcing Crosstalk Canceler is Near-optimal in DSL Channels", *Proceedings of IEEE Global Communications Conference (Globecom)*, Dallas, Dec. 2004.
Daniel P. Palomar, "Linear Transceivers for MIMO Channels: A Unified Framework for Convex Optimization", Guest Lecture in ELE 539A: Optimization of Communication Systems (Prof. Mung Chiang), Princeton University, Apr. 1, 2005, pp. 1-52.

* cited by examiner

*Primary Examiner*—Khanh C Tran
(74) *Attorney, Agent, or Firm*—Steven A. Shaw; W. James Brady; Frederick J. Telecky, Jr.

(57) ABSTRACT

Systems and methods are disclosed for determining mitigating noise in multi-pair communication system. A receiver coordinated system can include an error estimator that estimates noise for a first line of a plurality lines and provides an error estimate for the first line. A noise predictor applies a predetermined cross-correlation value to the error estimate to provide a correlated noise term that describes noise cross-correlation between the first line and a second line of the plurality of lines. A noise decorrelation component applies the cross-correlated noise term to substantially decorrelate noise for the second line.

21 Claims, 6 Drawing Sheets

SYSTEM AND METHOD TO MITIGATE INTERFERENCE IN DSL SYSTEMS

TECHNICAL FIELD

This invention relates generally to telecommunications, and more specifically relates to a system and method to mitigate interference in digital subscriber line (DSL) systems.

BACKGROUND

Research and development in telecommunications applications have been expanding to meet the increasing popularity in the Internet. One particular application relates to digital subscriber line (DSL) technologies, including symmetric DSL (SDSL) and asymmetric DSL (ADSL) and high data rate DSL (HDSL), to name a few. DSL can employ a variety of possible information rates and protocols depending on the type of DSL being implemented. DSL is a modem technology that converts existing telephone lines into access paths for multimedia and high speed data communications. DSL utilizes advanced digital signal processing and creative algorithms to provide greater amounts of information through twisted-pair telephone lines. One particular type of DSL system relates to multi-pair DSL systems employing a plurality of twisted-pair telephone lines in a bundle, which is often referred to as a vectored system.

Digital Subscriber Line (DSL) transmission can be constrained by interference from one or more sources when a signal from one copper pair inductively couples with the signal in another pair. This type of interference, which can distort the received signal from the originally intended signal, is commonly referred to as crosstalk interference. Cross-talk interference can originate from two kinds of sources. For example, crosstalk may originate from a transmitter belonging to the vectored system, which is referred to as in-domain cross talk. Crosstalk interference may also originate from a transmitter outside the vectored system, which is referred to as alien or out-of-domain crosstalk. The potential for crosstalk exists most predominantly at the ends of the loops where numerous pairs come together to be connected to the local exchange carriers' (LECs') active central office (CO) equipment or the customer's termination equipment. These sources may give rise to either of Far-End-Crosstalk (FEXT) and Near-End-Crosstalk (NEXT). Regardless of the type of crosstalk or its source, crosstalk operates to reduce signal-to-noise ratios on a given line.

As DSL technology advances and processing power increases, there is continuing interest in techniques for reducing crosstalk interference.

SUMMARY

The present invention relates generally to an approach to mitigate noise (e.g., crosstalk interference) in a multi-pair digital subscriber line system.

One aspect of the present invention provides a receiver-only coordinated technique in a vectored system can include an error estimator that estimates noise for a first line of a plurality lines and provides an error estimate for the first line in the vectored system. The error estimator can also provide error estimates for the remaining lines in the vectored system. A noise predictor applies a predetermined cross-correlation value, which describes noise cross-correlation between the first line and a second line of the plurality of lines, to the error estimate to provide an estimate for correlated noise term in the second line in the vectored system. A noise decorrelation component applies the cross-correlated noise term to substantially decorrelate noise for the second line.

Still another aspect of the present invention provides a system to a receiver coordinated system to reduce crosstalk interference in a multi-pair digital subscriber line system. The system includes a first receiver associated with a first twisted-pair line. The first receiver includes a decoder, an error estimator and a noise predictor. The decoder decodes a frequency domain input signal received via the first line and provides a corresponding decoded signal. The error estimator determines a noise estimate for the first line based on the input signal and the decoded signal. A noise predictor computes an indication of cross-correlated noise between the first line and at least a second line as a function of the noise estimate for a substantial portion of a plurality of tones. At least a second receiver, which is co-located with the first receiver and associated with a second twisted-pair line, decorrelates cross-correlated noise on the second line as a function of the indication of cross-correlated noise between the first line and the second line.

Yet another aspect of the present invention provides a receiver coordinated system to reduce crosstalk interference in a multi-pair digital subscriber line system. The system includes means for providing an estimate of noise for a first line of a plurality of lines based on a frequency domain input signal and a corresponding decoded output signal for the first line. The system also includes means for predicting a cross-correlated noise term for the first line and a second of the plurality of lines as a function of the estimate of noise for the first line and a predetermined cross-correlation parameter that describes a cross-correlation of interference between the first line and the second line for a set of the same respective tones. The system also includes means for decorrelating noise on the second line based on the predicted cross-correlated noise term to provide a corresponding decorrelated input signal for the second line.

DETAILED DESCRIPTION

Unless indicated otherwise, the following nomenclature is used in this description of this paper: Bold letters indicate vectors, lower-case is used to indicate time-domain signals, and upper-case is used to indicate frequency-domain signals. Additionally, the superscripts "T" and "*" denote the transpose and conjugate transpose operations, respectively. Additionally, in the following description for purposes of ease of explanation, the terms "line" and "pair" are used interchangeably to refer to a twisted-pair line of electrically conductive material, such as act as a single telecommunications path (e.g., for POTS or ISDN services).

Figure 1:
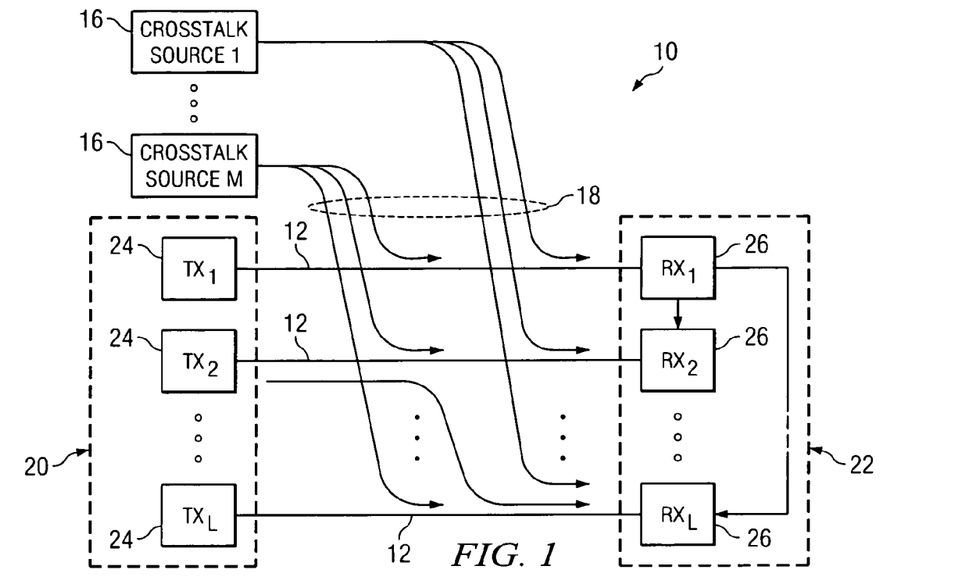
FIG. 1 depicts an example of a vectored DSL system that can be implemented according to an aspect of the present invention.

FIG. 1 depicts an example of a DSL environment for a vectored system 10 that can be implemented according to an aspect of the present invention. In the example of FIG. 1, the vectored system 10 includes L twisted-pair lines, where L is a positive integer greater than or equal to two (i.e., the vectored system 10 can include as few as two lines 12). The group of lines 12 that form the vectored system 10 may comprise a portion of a line grouping that is often referred to as a bundle. It will be understood and appreciated, however, that the respective lines 12 may be from different bundles.

For the example of a digital subscriber line (DSL) system, each of the lines 12 (over at least a portion of its transmission path) includes a twisted-pair of electrically conductive wires, typically of a plain old telephone system (POTS). As electrically conductive wires, each of the lines 12 is subject to interference from other lines, within the vectored system 10 as well as from one or more other sources 16. Such interference is commonly referred to as crosstalk interference. The cross-talk interference may include in-domain crosstalk between lines 12 in the vectored system 10. Additionally or alternatively, crosstalk interference can originate from one or more M sources 16 (where M is a positive integer, M≧1) outside the vectored system 10, which is referred to as alien or out-of-domain crosstalk, indicated at 18. Thus, one or more of the crosstalk sources 16 may reside in a bundle that is common to one or more of the lines 12 that form the vectored system 10.

For purposes of simplicity of explanation, the vectored system 10 is depicted for the case of downstream transmission from a transmit system 20 to a receive system 22. For example, the transmit system 20 can be part of a central office or other cabinet structure and includes a plurality of transmitters 24. The receive system 22 similarly includes co-located receivers, such as in a building cabinet, central office, or customer premises. Thus, each line 12 interconnects a respective pair of transmitters and receivers 24 and 26, respectively. In the example of FIG. 1, the vectored system includes transmitters ($TX_1$, $TX_2$ through $TX_L$) 24 and associated receivers ($RX_1$, $RX_2$ through $RX_L$) 26, where L is a positive integer greater than one. It is to be understood that each of the systems 20 and 22 typically are implemented as part of transceiver systems for both transmitting and receiving data between termination points of the respective lines.

The receive system 22 employs receiver coordinated noise decorrelation according to an aspect of the present invention. For purposes of consistency and simplicity of explanation, the approach described herein will be described with respect to discrete multi-tone transmission (DMT) in which data is transmitted over a plurality of discrete tones or frequency bands. As described herein, for DMT transmission, noise, including crosstalk interference, is correlated for the same tone across the different users (the receivers 26) in the receive system 22. With this understanding, the receive system 22 can implement receiver-side coordination for decorrelating such crosstalk interference. For example, an estimate of the noise (corresponding to an error signal) can be determined for the receiver RX1 and provided to each of the subsequent receivers RX2 through $RX_L$. Similarly, each subsequent receiver RX2 through $RX_{L-1}$ can supply the corresponding noise estimate to the subsequent receivers 26 in the system 22. A predetermined cross-correlation weighting factor can be applied to each of the noise estimates to provide subsequent receivers an indication of the noise cross-correlation for each of the respective tones across the DMT spectrum. The noise cross-correlation value is computed for a given pair of lines for each of the tones. Each subsequent receiver RX2 through $RX_L$ further can employ noise decorrelation as a function of the cross-correlated noise terms to provide a noise-decorrelated input signal that can be decoded to provide a corresponding byte stream of data.

Figure 2:
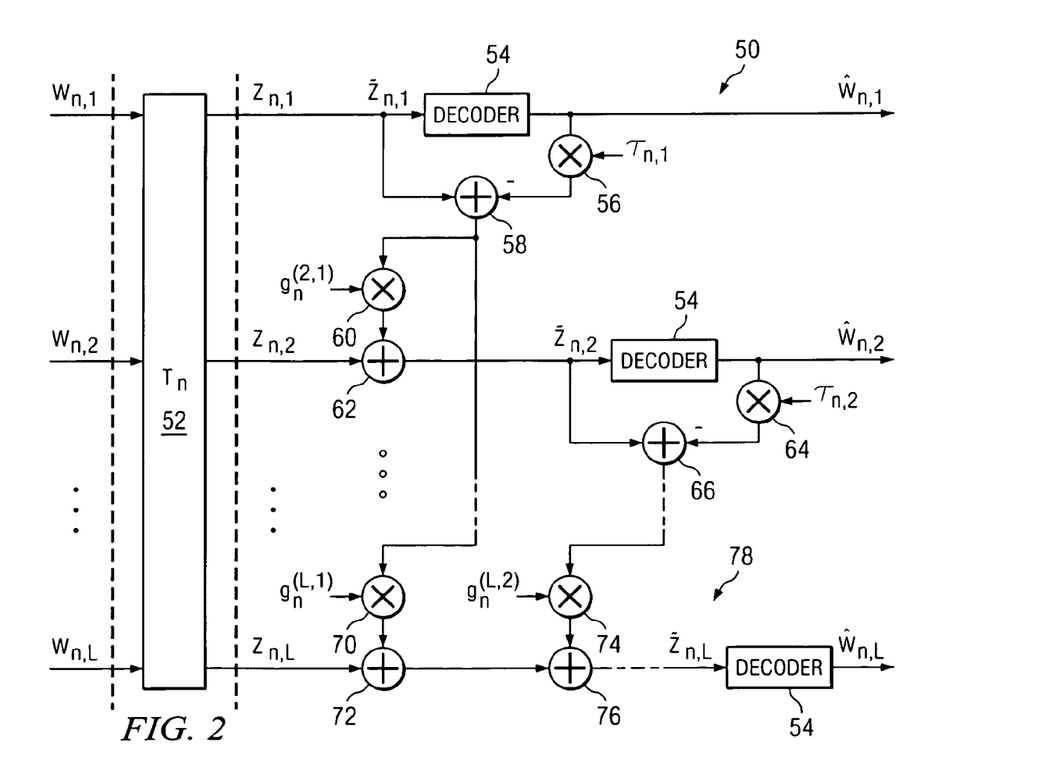
FIG. 2 depicts an example of a receiver coordinated vector system according to an aspect of the present invention.

FIG. 2 depicts a schematic block diagram of a receiver coordinated vector system 50 according to an aspect of the present invention. Frequency domain input signals from the transmitter (not shown) are provided for each line to channel and time domain signal processing block 52. The frequency domain transmitter signals are indicated at $W_{n,1}$, $W_{n,2}$ through $W_{n,L}$, where n denotes the number of DMT tones in the signal and where L denotes the number of lines being input to the system 50. For example, the channel and time domain signal processing block 52 can perform inverse fast Fourier a transform (IFFT) and additional processing in the time domain including, for example, filtering, interpolation/decimation, and channel estimation. The channel and time domain signal processing block 52 can also perform corresponding fast Fourier a transform (FFT) to convert the received input signals back into the frequency domain. The channel and time domain signal processing block 52 provides corresponding frequency input signals $Z_{n,1}$, $Z_{n,2}$, and $Z_{n,L}$ at the receiver side for each of the L respective lines.

Those skilled in the art will understand and appreciate various types of front end processing that can be implemented in the time domain by corresponding signal processing block 52. Additionally, separate blocks can be provided for each of the respective lines or common or integrated signal processing can be utilized. The signal processing and filtering functionality implemented by the block can be implemented in hardware, software or a combination of hardware and software.

The receiver for each of the L lines includes a respective decoder 54. Each respective decoder 54 is programmed and/or configured to decode the respective input signals and provide a corresponding decoded output byte stream indicated at $\hat{W}_{n,1}$, $\hat{W}_{n,2}$ through $\hat{W}_{n,L}$. Each respective decoder can be configured to perform one or more levels of decoding. For example, such decoding may include one or more of a slicing function, trellis decoding and Reed Solomon decoding. Those skilled in the art will understand appreciate how these and/or other types of known and yet-to-be developed types of decoding can be implemented in the system 50.

The receivers for at least some of the L lines can also perform error estimation For instance, the error estimation can be determined based on the decoder input and output signals for each line. The receivers can also perform noise prediction to ascertain an indication of cross-correlated noise between respective pairs of the lines. The cross-correlated noise includes, for example, crosstalk interference, such as alien crosstalk interference as well as in-domain crosstalk interference.

By way of further example with regard to lines 1 and 2, a corresponding noise estimate is determined by subtracting the output signal $\hat{W}_{n,1}$ from the input signal of $Z_{n,1}$. Because the decoder input and output signals may be at different scales, a scaling factor can be applied for each of the respective n tones. For example, a multiplication block 56 multiplies the scaling factor, which is indicated at $\tau_{n,1}$, and decoder output signal $\hat{W}_{n,1}$. The scaling factor, which can vary as a function of the constellation size, normalizes the decoder output signal to the scale of the input signal to facilitate subsequent error estimation. Additionally or alternatively, scaling can be omitted or the scaling factor can be provided as a value of one (e.g., $\tau_{n,1}=1$) such that no scaling is performed between the decoder input and the decoder output A summation block 58 subtracts the scaled decoder output from the decoder input $Z_{n,1}$ to provide an error signal corresponding to a noise estimate for the noise on line 1. A multiplication block 60 multiplies the noise estimate and a predetermined cross-correlation value, indicated at $g_n^{(2,1)}$, for each of the respective tones to predict cross-correlated noise between line 1 and line 2. The cross-correlation value $g_n^{(2,1)}$ includes a set of cross-correlation values (e.g., a complex value including real and imaginary parts) that describe cross-correlation of noise between line 1 and line 2 for each of the respective n tones. The cross-correlation values can be computed and stored for the receiver coordinated system 50 as a cross-correlation matrix $G_n$, such as can be determined during a training procedure. For instance, the cross-correlation matrix $G_n$ corresponds to a lower triangular matrix having elements $g_n$ that correlate noise between each respective pair of lines 1 through L for each tone in the DMT spectrum.

$$G_n = \begin{bmatrix} g_n^{(2,1)} & & & & \\ g_n^{(3,1)} & g_n^{(3,2)} & & & \\ \vdots & & \ddots & \ddots & \\ \vdots & & \ddots & \ddots & \ddots \\ g_n^{(L,1)} & g_n^{(L,2)} & \cdots & \cdots & g_n^{(L,L-1)} \end{bmatrix} \quad \text{Eq. 1}$$

A different cross-correlation value can be computed for each of the respective n tones to provide an indication of the cross-correlation between each respective pair of lines. The error estimates for the noise on line 1 (e.g., provided by summation block 58) further can be supplied and utilized as part of a cross-correlated noise prediction and decorrelation for each of the other lines 2 through L in the system 50.

The receiver associated with line 2 is configured to perform noise decorrelation on the input signal $Z_{n,2}$ as a function of the predicted cross-correlated noise (for line 1 and line 2). By way of further example, the multiplication block 60 provides the indication of predicted cross-correlated noise (for line 1 and line 2) to a summation block 62 that performs noise decorrelation on the input signal $Z_{n,2}$. The summation block 62 can perform noise decorrelation by adding the indication of predicted cross-correlated noise to the input signal $Z_{n,2}$. The summation block 62 provides a noise-decorrelated input signal $\mathcal{Z}_{n,2}$ to the input of the decoder 54 for line 2. The operation performed by the summation block subtracts the cross-correlated noise from the input signal $Z_{n,2}$.

The noise decorrelation algorithm further can include providing noise estimates for line 2 to the receivers of each other line, excluding line 1 which is not affected by the noise decorrelation algorithm. An estimate of the noise associated with line 2 is also determined by subtracting a scaled version of decoder output signal $\hat{W}_{n,2}$ from the decorrelated decoder input signal $\mathcal{Z}_{n,2}$. For example, the decoder output signal $\hat{W}_{n,2}$ can be scaled by multiplication block 64 multiplying a scaling factor $\tau_{n,2}$ with the decoder output signal $\hat{W}_{n,2}$. The multiplication block 64 provides the scaled decoder output $\hat{W}_{n,2}$ to a summation block 66. The summation block 66 subtracts the scaled decoder output (e.g, $\tau_{n,2} \times \hat{W}_{n,2}$) from the decorrelated decoder input signal $\mathcal{Z}_{n,2}$ to provide a corresponding noise estimate for each of the plurality of n tones. This noise estimate can be supplied for performing noise decorrelation in each of the subsequent lines (e.g., line 3 through line L) similar to the noise decorrelation performed at the receiver of line 2.

With regard to the ultimate line L to which noise decorrelation can be performed, such noise decorrelation can employ the noise estimates computed for each of or at least a portion of) the preceding other lines 1 through L-1. For example, as shown in Eq. 1, the elements of the cross-correlation matrix $G_n$ for line L include cross-correlation elements describing the cross-correlation of noise between line L and each of the proceeding lines 1 through L-1 for each of the n tones. The cross-correlation value between line L and a given preceding line can be applied to the respective noise estimate for the given preceding line to provide an indication of predicted cross-correlated noise for each of the n tones.

As shown in the example of FIG. 2, a multiplication block 70 multiplies the error estimate for line 1 with the noise cross-correlation element $g_n^{(L,1)}$ to provide a corresponding prediction of cross-correlated noise between the line L and the line 1. A summation block 72 applies the indication of predicted cross-correlated noise to the respective input signal for line L, $Z_{n,L}$, to implement noise decorrelation on such input signal for each of the n tones. The summation block 72 provides the (partially) decorrelated signal as an input to summation block 76 which performs noise decorrelation of such signal according to the cross-correlation of noise between line L and line 2. For instance, a multiplication block 74 performs noise prediction by multiplying the cross correlation element $g_n^{(L,2)}$ with the estimated noise from the summation block 66 for each of the plurality of tones. The summation block 76 thus can further decorrelate the partially decorrelated signal (from the summation block 72) by summing the partially decorrelated signal with the predicted cross-correlated noise provided by multiplication block 74. The resulting signal from the summation block 76 can be further decorrelated by employing similar noise decorrelation (indicated by ellipsis 78) relative to cross-correlated noise terms for one or more other lines. For line L in the example of FIG. 2, the resulting decorrelated signal $\mathcal{Z}_{n,L}$ is provided as decoder input signal for the decoder 54 of line L.

It will be appreciated that the total data rate for the vectored system 50 is independent of the order in which noise decorrelation is performed on the respective lines. Additionally, it will be apparent that the amount of noise decorrelation for a particular line of the receiver coordinated system 50 can vary according to the number of lines in the system and where in the decorrelation algorithm the particular line is situated. For instance, no noise decorrelation is performed for the first line (that receives input signal $W_{n,1}$) in the vectored system 50. It is to be further understood that the placement of a line in the decorrelation algorithm can be independent from its location in the bundle containing the lines. By implementing decorrelation in the manner described above, the amount of noise on at least a substantial portion of the lines can be significantly reduced, such as shown and described herein (See, e.g., FIG. 5). Additionally, since the approach described herein can be utilized to reduce noise efficiently, a multi-pair DSL system can achieve increased data bandwidth (See, e.g., FIGS. 6 and 7).

Figure 3:
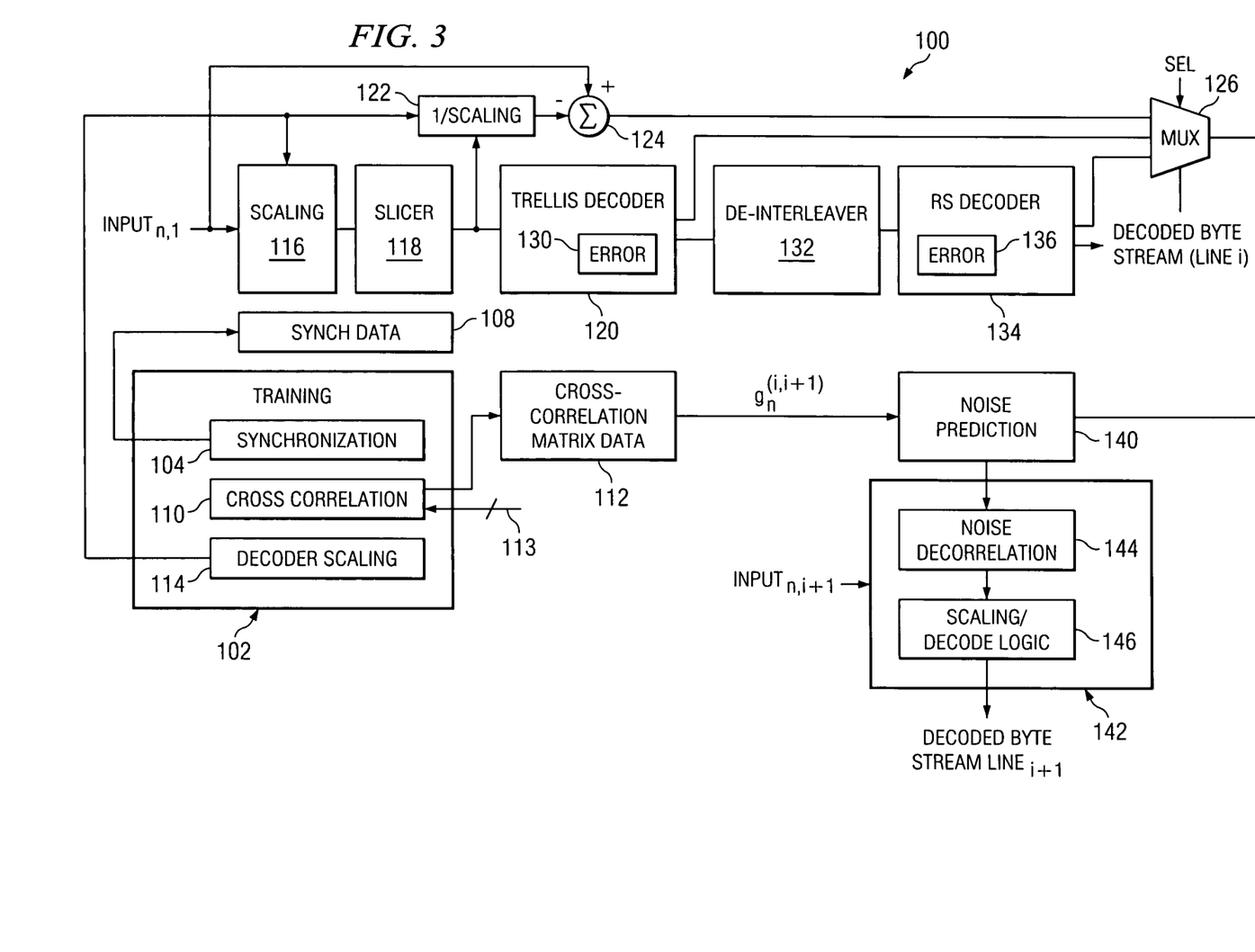
FIG. 3 depicts a functional block diagram of at least a portion of a vectored system that can be implemented according to an aspect of the present invention.

FIG. 3 depicts another example of a system architecture for implementing receiver coordinated noise decorrelation according to an aspect of the present invention. The example system 100 is configured for implementing decorrelation of crosstalk interference between a pair of lines i and i+1 for a multi-pair DSL system, although the approach being described is equally applicable to a multi-pair systems with a different number of lines. As described herein, the decorrelation can be implemented between a respective pairs of lines for each of a plurality of tones 1 through n, where n denotes the number of DMT tones. It is assumed for purposes of the following example that each line i and i+1 corresponds to a twisted-pair of electrically conductive cable, and that each line transmits data in DMT blocks that include substantially the same number n of respective tones.

Prior to operating a normal mode for transmitting data between a remote transmitter and the receiver system 100, the system 100 implements a training procedure in which a variety of performance metrics are performed and communication parameters are set. The training procedure, schematically indicated at 102, can include certain portions of training that are implemented independently of other lines and different portions of training can be inter-line dependent.

By way of example, the training 102 includes a synchronization module 104. The synchronization module 104 operates to synchronize each of the respective receivers so that the DMT blocks transmitted to the respective receivers in the receiver system 100 are synchronized relative to each other. The synchronization improves the noise decorrelation. An example of one possible synchronization approach is shown and described with respect to FIG. 4.

Using vector notation, the output signal on a given pair i can be expressed as follows:

$$y_i = H_i^c x_i^p + n_i + \sum_{k=1}^{M} A_{i,k}^c z_k^p \qquad \text{Eq. 2}$$

where $y_i$ is a column vector containing a block of N received samples, $x_i^p$ is (N+v)×1 and holds the transmitted samples on pair i, $n_i$ is N×1 and contains the Gaussian-distributed noise samples received on pair i, and $z_p^k$ is (N+ξ)×1 and holds the transmitted samples of crosstalk source k. The samples contained in these vectors are ordered from most recent to least recent, and the parameter N can be chosen to be at least equal to twice the number of DMT tones (e.g., to satisfy Nyquist criteria).

A noise correlation matrix can be assumed to be $R_{n_i n_i}=I$ (e.g., unity matrix) with substantially no loss of generality. The matrix $H_i^c$ is N×(N+v) and represents the convolution matrix corresponding to the channel of pair i. The matrix $A_{i,k}^c$ is N×(N+ξ) and represents the convolution matrix of the crosstalk coupling channel from source k to victim pair i. The parameters v and ξ denote the length (in number of samples) of the non-zero part of the impulse response of the direct channel and of the alien crosstalk coupling, respectively. The sampling rates and sampling times are assumed to be substantially identical for all pairs in the system 100. It is noted that the direct and the indirect channels are here assumed to include the time-domain filtering of the transmitter and receiver modems.

Figure 4:
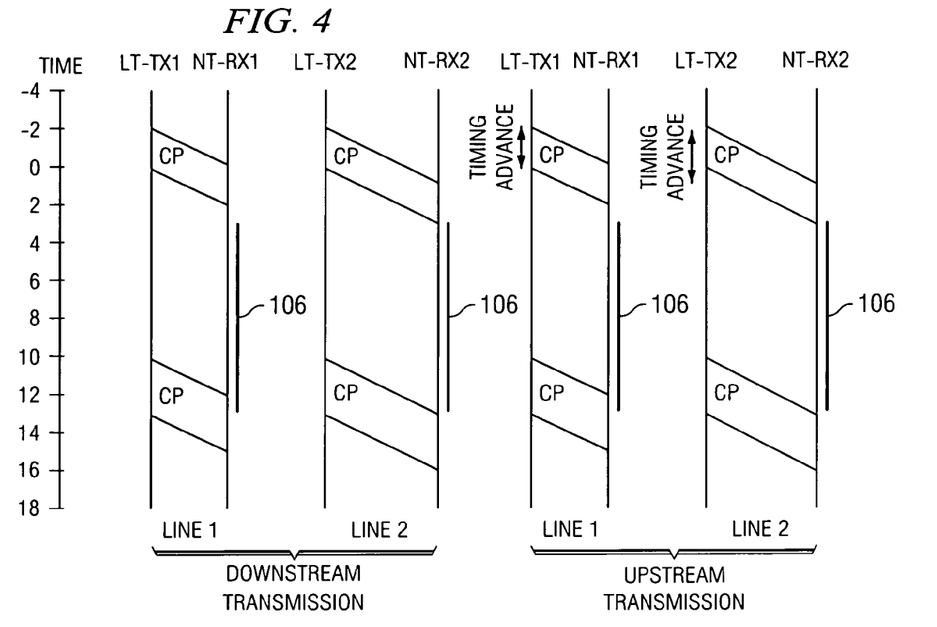
FIG. 4 depicts a timing diagram implementing synchronization of transmissions according to an aspect of the present invention.

Continuing with the example where DMT transmission is employed in the system 100 (and referring between FIGS. 3 and 4), it is further assumed that each DMT symbol includes both a cyclic prefix (CP) and a cyclic suffix (CS), as shown in FIG. 4. It is also assumed that timing advance is employed at the customer premises modems, such as defined in the Very-high-speed Digital Subscriber Line (VDSL); namely, ITU Recommendation G.992.5, *Asymmetric Digital Subscriber Line (ADSL) transceiver-Extended bandwidth ADSL2 (ADSL2plus+)*, May 2003. FIG. 4 thus illustrates the concept of synchronized DMT transmission among multiple pairs, in which the time scale corresponds to the vertical axis and two twisted-pair lines are assumed and both transmission directions are considered.

In FIG. 4, LT-TX1 and LT-TX2 indicate the transmitters at the Line Termination (LT) or central office side for the two lines. NT-TX1 and NT-TX2 indicate the transmitters at the Network Termination (NT) or customer premises side for the two pairs. The corresponding receivers are denoted as NT-RX1, NT-RX2, LTRX1 and LT-RX2. The transmission is shown for the duration of a single DMT block. For the example of FIG. 4 and this description, the following assumptions are made: The channel memory is equal to two units of time, and the CP is set equal to two units of time. The propagation delay of pair 1 is two units of time, and the propagation delay of pair 2 is three units of time. The maximum propagation delay is equal to three units of time, so the CS is also set to three units of time. The timing advance at the NT side equals the propagation delay of the corresponding pair.

In the above example, the block transmission of the main part of the DMT symbol starts at time 0 for the LT transmitters. The transmission of the CP starts at time −2 units of time. The timing advance at the NT side means that the block transmission at the NT side is advanced by an amount of time equal to the propagation delay of the line. This results in DMT symbols at the NT-side starting transmission at the same times as those at the LT side. That is, it is assumed that the DMT blocks are synchronized across all transmitters.

As mentioned above with respect to FIG. 3, the synchronization module 104 of the training block 102 synchronizes the DMT blocks across the receivers in the system 100 to improve exploitation of noise correlation among the receivers for each of the lines i and i+1. The synchronization module 104 can perform the synchronization between receivers for each of the lines i and i+1 by utilizing the cyclic suffix (CS) that is transmitted with each DMT symbol.

In FIG. 4, blocks of samples extracted at each of the receivers are depicted as vertical line segments 106. As an example, for NT-RX2, the received block 106 includes all the samples of the main part of the DMT symbol. For NT-RX1, the received block includes part of the CS, in order to coincide in time with the received block of NT-RX2. Similarly, the received blocks at the LT side are chosen to coincide in time. The inclusion of part of the CS implies only a phase change for the channel model. A mathematical representation of this scheme follows.

By way of example, the inclusion of the CP and the CS can be expressed as $$x_i^p = P_i x_i, \qquad \text{Eq. 3}$$

where $x_i$ is an N×1 vector containing the DMT block samples to be transmitted, excluding the CP and the CS.

The matrix $P_i$ is (N+v)×N and models the addition of the CP and CS. Letting the length of the CP be equal to v, the length of the CS that is included in the receive block be equal to $\mu_i$ and, with the assumption that $\mu_i<v$, matrix $P_i$ can be expressed as follows:

$$P_i = \begin{bmatrix} O_{\mu_i \times (N-\mu_i)} & I_{\mu_i \mu_i} \\ I_{N \times N} \\ I_{(v-\mu_i) \times (v-\mu_i)} & O_{(v-\mu_i) \times (N-v+\mu_i)} \end{bmatrix} \quad \text{Eq. 4}$$

Additionally, the FFT and IFFT operations are represented as $$Y_i = Q y_i \quad \text{Eq. 5}$$

$$x_i = Q^* X_i, \quad \text{Eq. 6}$$

where $Y_i$ is the FFT output at the receiver, and $X_i$ is the IFFT input at the transmitter; and the matrices Q and Q* correspond to the FFT and IFFT transforms, respectively.

From Eqs. 2, 3, 5 and 6, a new expression $Y_i$ for a given pair i can be obtained for the received samples of user i at the FFT output, as follows:

$$Y_i = Q H_i^c P_i Q^* X_i + Q n_i + \sum_{k=1}^{M} Q A_{i,k}^c z_k^p \quad \text{Eq. 7}$$

$$= Q H_i Q^* X_i + N_i' + \sum_{k=1}^{M} A_{i,k} \quad \text{Eq. 8}$$

$$Y_i = \Lambda_i X_i + N_i' + A_i \quad \text{Eq. 9}$$

Note that $H_i = H_i^c P_i$ $H_i^c P_i$ is a circulant matrix, such that $\Lambda_i = Q H_i Q^*$ is a diagonal matrix. The correlation matrix of the new noise term is $R_{N_i' N_i'} = I$. The choice of $\mu_i$ in the definition of $P_i$ (Eq. 4) depends on the timing of the receive block, which, as described herein, can be established by the synchronization module 104. It will be appreciated that the choice of $\mu_i$ choice only affects the phase of the diagonal elements of $\Lambda_i$ in Eq. 6.

Referring back to FIG. 3, the training 102 also includes a cross-correlation module 110. The cross-correlation module 110 can be implemented as software, hardware or a combination of hardware and software. Similar to the synchronization module 104 the cross-correlation module 110 is an inter-line dependent procedure that is utilized to populate a cross-correlation matrix stored as matrix data 112. For instance, the cross-correlation module 110 can be programmed and/or configured to perform auto-correlation of each pair of respective signals 113 in the vectored system 100 for which noise decorrelation is to be performed. The cross-correlation matrix data 112 corresponds to a matrix $G_n$ (see, e.g., Eq. 1) for each of the n tones in the DMT blocks. That is, the cross-correlation matrix $G_n$ provides a cross-correlation of noise between a pair of twisted pair lines (e.g., for lines i and line i+1) for each of the n tones. One or more such matrices can be provided for the vectored system.

As an example, the cross-correlation module 110 can be implemented during training by sending known patterns downstream via each of the lines, including line i and line i+1, to corresponding receivers. The downstream training patterns can be sent concurrently to the respective receivers for each of the n tones or for a substantial portion of the n tones. If such training patterns are not provided for each of the tones, mathematical statistical and/or other means can be employed for estimating noise-cross correlation elements for the tones on which no training patters are provided.

By way of further example, the cross-correlation module 110 can include a noise estimation component that determines noise for each of the respective lines. Since the pattern during such training is known, a good estimate of noise can be determined for each respective line. Once the noise for each line has been determined, the noise between each respective pair of lines can be cross-correlated, such as by applying an auto correlation function. The auto correlation function in turn provides the cross-correlation element for each pair of lines in the vectored system describing the cross-correlation for each of the n tones. Thus, for the simplified example of FIG. 3, such cross-correlation is implemented for each (or at least some) of the n tones for cross-correlating noise between line i and line i+1. As described herein, the cross-correlation matrix $G_n$ corresponds to a lower triangular matrix and can store values for each tone including both a real and imaginary part providing a complex cross-correlation value. For example, the cross-correlation element (of the matrix $G_n$) for lines i and i+1 is depicted as $g_n^{i,i+1}$. The $g_n^{i,i+1}$ term can include both real and imaginary portions so as to provide a complex correlation value for each of the n tones.

The training 102 further can include decoder scaling module 112 that is operative to implement scaling of the FFT signal for each of the n tones. The decoder scaling module can be implemented as including software, hardware or a combination of hardware and software. The amount of scaling implemented for a given line can vary as a function of the constellation size, which is usually fixed for the given line. For instance, the decoder scaling for each line i and line i+1 can be fixed for the respective decoder functions based on the constellation size transmitted over each of the lines. The scaling generally corresponds to a scaling factor that can be applied to a decoder output for normalizing the decoder output relative to the decoder input to facilitate signal processing, including error estimation, for each of the respective n tones. The decoder scaling module 114 provides the scaling factor to a scaling block 116, which receives the input signal $INPUT_{n,i}$. The scaling block 116 thus is operative to perform scaling on the input signal $INPUT_{n,i}$ to facilitate subsequent processing.

The scaling block 116 provides a scaled version of the respective $INPUT_{n,i}$ signal to a slicer 118. The slicer 118 may correspond to a first level of decoding. For instance, the slicer 118 can compute a hard decoding or slice of the input constellation, such as providing an indication of the error estimate associated with the input constellations for each of respective tone in the scaled input signal. The slicer 118 thus provides respective constellation estimates to a trellis decoder 120 and to an inverse scaling block 122. Those skilled in the art will understand and appreciate various types and implementation of slicing that can performed by the slicer 118 (e.g., hard and/or soft slicing).

The inverse scaling block 122 is utilized as part of an error estimate function performed for the receiver associated with line i. For example, the inverse scaling block 122 employs the decoder scaling data, as determined during training by the decoder scaling module 114. Thus, the inverse scaling block 122 provides an unscaled representation of the slicer output. A summation block 124 can subtract the unscaled representation of the slicer output from the corresponding unscaled input signal $INPUT_{n,i}$ to provide an error estimate associated with the slicer output. The summation block 124 provides the error estimate to a corresponding input of a multiplexer 126.

That is, the trellis decoder 120 can provide a second level of decoding for the receiver system associated with line i. The trellis decoder 120 receives the weighted constellation points from the slicer 118 and utilizes the weighted constellation points for each of the tones to improve the error probability at the output of the decoder relative to the slicer output. Thus, the trellis decoder 120 determines a more accurate noise estimate than the slicer 118, which can be utilized in noise decorrelation as described herein. The trellis decoder 120 provides a corresponding decoded output to a de-interleaver 132 (for each of the respective n tones). The trellis decoder can be implemented as software, hardware or a combination of hardware and software. Those skilled in the art will understand and appreciate various trellis decoding algorithms and trellis representations that can be employed to perform decoding and error estimation of the slicer output.

The trellis decoder 120 can also include an error component 130 that is configured and/or programmed to estimate error between the input to the trellis decoder and the decoded output provided by the decoder. The corresponding error component 130 provides the error estimation to another input of the multiplexer 126. The error estimate corresponds to an indication of noise associated with the line i.

The de-interleaver 132 operates to de-interleave the data into an original order for further processing, which is opposite an interleaving process performed at a corresponding transmitter. The de-interleaved data is provided to a Reed Solomon (RS) decoder 134. The RS decoder 134 performs further error correction coding, such as based on associate parity bits provided in each DMT block. For example, the RS decoder employs a coding scheme that enables reconstruction of an original polynomial from the de-interleaved data symbols. Those skilled in the art will understand and appreciate various approaches of RS decoding that can be employed. The RS decoder 134 provides a decoded byte stream for line i.

The RS decoder 134 can also include an error estimation block 136 that is configured to determine an error estimation associated, such as based on the corresponding de-interleaved input (from the de-interleaver 132) and a corresponding decoder byte stream. The error estimation component 136 provides an estimate of the error for each of the n tones to another input of the multiplexer 126. Because of the improved error probability at the RS decoder output, the estimated noise made with the RS decoder output can be of even improved accuracy compared with the estimated noise made with the trellis decoder output. The multiplexer 126 thus receives error estimates indicative of different types of noise provided by different levels of decoding associated with the line i. The multiplexer 126 can provide one of three different error estimation signals to a corresponding noise prediction component 140 based on a selection (SEL) signal. The RS decoder 134 corresponds to a third level of decoding that can be implemented in the receiver for line i, which affords three different levels of error estimation. It will be further appreciated that any number of one or more levels of decoding can be implemented on line i, which can be employed to provide corresponding levels of error estimation that can be utilized (e.g., by employing the multiplexer 126) to provide a desired level of error estimation for use in performing noise decorrelation according to an aspect of the present invention. Thus, in the example of FIG. 3, the slicer, trellis decoder and the RS decoder (individually or in any combination) provides means for decoding the input signal of line i. It will be understood and appreciated that actual implementation can utilize one type of noise estimate instead of providing the system with a capability to select any of the three noise estimates shown and described in the example of FIG. 3.

As a further example, the multiplexer 126 can provide different levels of error estimation depending upon which input is selected. That is, the SEL signal can be set for selecting a desired level of error estimation. The SEL signal can be established, for example, by setting a register entry (e.g., hard coded or programmatically via software) depending on design specifications and user requirements. The multiplexer 126 provides the selected error estimation to the noise prediction component 140 for determining an estimate of correlated noise between line i and line i+1.

The noise prediction component 140 employs the cross-correlation matrix data 112 for a given pair of lines. In the example of FIG. 3, the noise prediction component 140 applies the matrix element that describes the cross-correlation of noise between line i and line i+1, as indicated at $g_n^{(i,i+1)}$. The noise prediction component 140 thus provides a cross-correlated noise term that describes the cross-correlation of noise between lines i and i+1 for each of the respective n tones in the DMT block. The cross-correlated noise for lines i and i+1 are provided to a decoder system 142 associated with the line i+1.

The decoder system 142 includes a noise decorrelation component 144 that is configured and/or programmed to apply the cross-correlated noise term provided by the noise prediction component 140 to substantially decorrelate the noise (e.g., crosstalk interference) associated with the input signal $\text{INPUT}_{n,i+1}$, which corresponds to the FFT transformation of the respective input signal for line i+1. That is, as mentioned above, the $\text{INPUT}_{n,i+1}$ signal corresponds to a frequency domain representation of the input signal, such as having already performed time domain channel and signal processing (e.g., filtering). The noise decorrelation component 144 performs noise decorrelation on the $\text{INPUT}_{n,i+1}$ signal as a function of the cross-correlated noise term from the noise prediction component 140 to provide a corresponding decorrelated version of the $\text{INPUT}_{n,i+1}$ signal. The decorrelated input signal can be provided to a scaling/decode logic block 146 of the decoder system 142 for further processing and decoding to provide the decoded byte stream for line i+1. The scaling/decode logic block can be programmed and/or configured to perform scaling and decoding functions (e.g., slicing, trellis decoding and/or RS decoding) for line i+1. By implementing decorrelation according to an aspect of the present invention, the crosstalk noise on line i+1 is mitigated.

Figure 5:
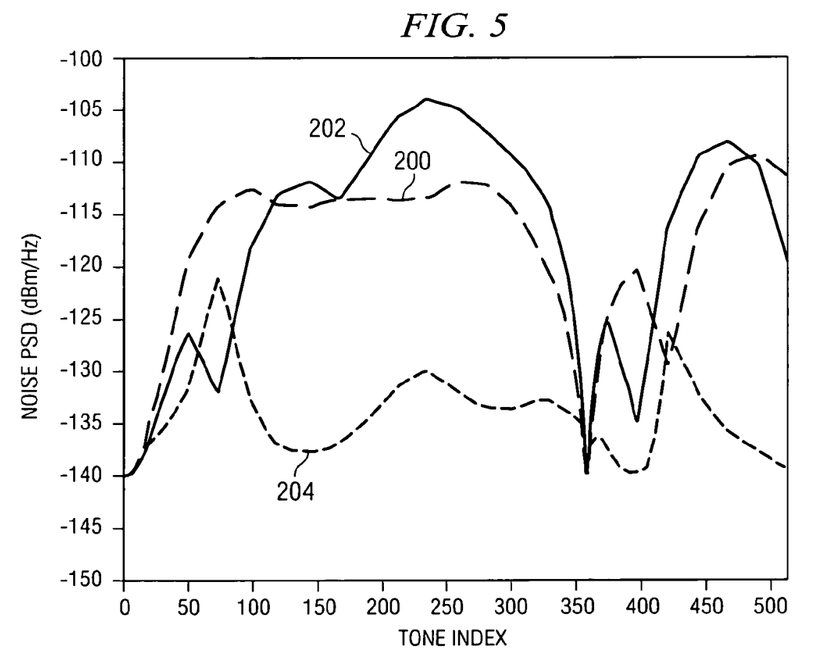
FIG. 5 depicts a comparison of noise over a range of tones for before and after decorrelation according to an aspect of the present invention.
Figure 6:
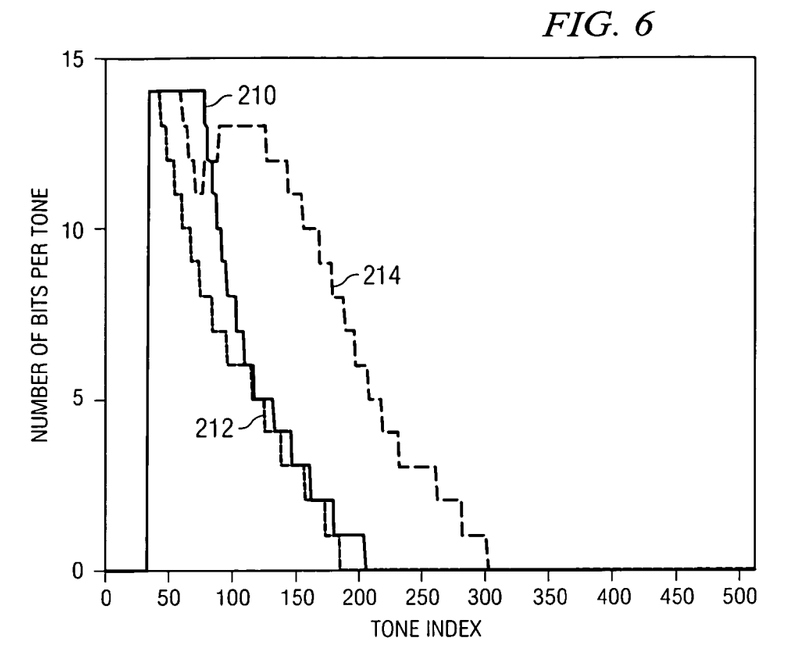
FIG. 6 depicts a comparative example of bit distributions before and after noise decorrelation according to an aspect of the present invention.
Figure 7:
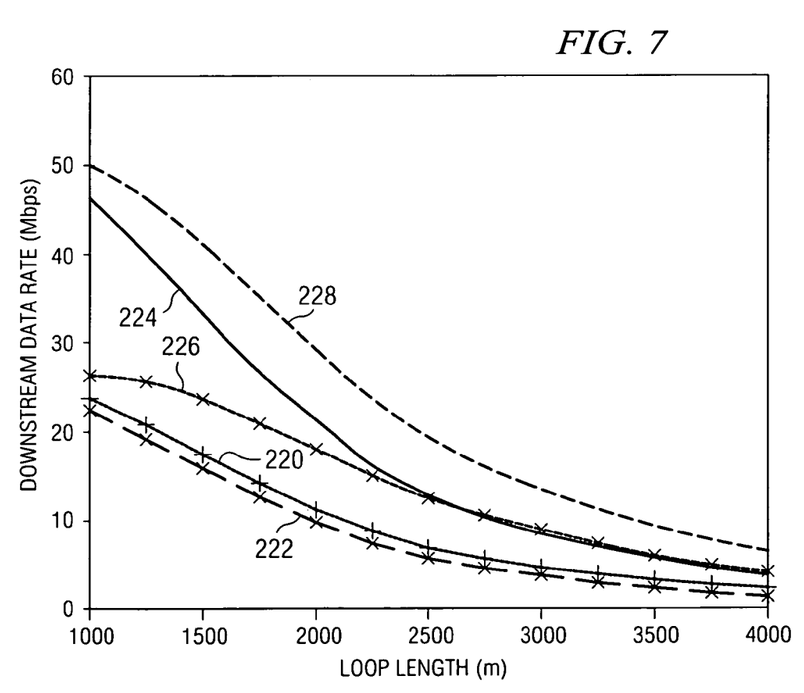
FIG. 7 depicts comparative examples of data rate reach curves before and after performing noise decorrelation according to an aspect of the present invention.

The effect of reducing noise via receiver coordinated vectoring approach described herein will be better appreciated with reference to FIGS. 5-7. FIG. 5 illustrates curves 200, 202 and 204 that represent noise power spectral densities (PSDs) over a range of tones for two receivers associated with pair 1 and pair 2. The example of FIG. 5 assumes a 3 km loop length for each of first and second pairs that are connected to the respective receivers. The first curve 200 represents the noise PSD for pair 1, both before and after noise decorrelation has been performed. That is, with reference back to FIG. 2 or 3, pair 1 may correspond to a first receiver to which noise decorrelation is not implemented. Thus the noise of pair 1 is unaffected by the noise decorrelation algorithm. The curve 202 represents noise PSD for pair 2 before decorrelation and the curve 204 represents the noise PSD for pair 2 after implementing decorrelation according to an aspect of the present invention. From the example of FIG. 5, it will be appreciated that the noise PSD of pair 2 is significantly mitigated after the application of the decorrelation algorithm, such as described herein.

The reduced noise can be employed to improve performance of the receiver coordinated system implementing such noise decorrelation. As mentioned above, a training process can utilize one or more receiver performance metrics associated with operating conditions of each given receiver to set communication parameters for each pair. Such training may be performed before the DSL link is established (e.g., part of initialization) as well as after the DSL link is operational (e.g., adaptation). For example, training to determine performance metrics for the receiver can be performed after establishing parameters for the noise decorrelation procedure so that improved communication parameters can be established for at least some of the pairs. The communication parameters can include, for example, the number of bits (or constellation size) per tone, per tone, PSD on various tones and the like.

By way of example, during training implemented after-noise decorrelation, the transceivers at ends of each pair can provide known training tones and patterns to ascertain one or more receiver performance metrics. The performance metrics can be, for example, signal-to-noise ratio (SNR) or noise margin (NM), signal-to-interference plus noise ratio (SINR), frame error rate (FER), bit error rate (BER) or other receiver performance metrics or combinations of metrics. The SNR and NM are expressed in decibels (dB). The higher this number, the more bits of data that can be carried within that specific tone. Therefore, by implementing noise decorrelation according to an aspect of the present invention to decrease crosstalk interference, one or more performance metrics (e.g., SNR or SINR) can improve, such that more bits may be provided for each tone across at least some pairs in the multi-pair bundle.

By way of further illustration, FIG. 6 depicts bit distributions as a function of the tone index for the two receivers associated with pair 1 and pair 2 under substantially the same circumstances as shown and described with respect to FIG. 5. In particular, FIG. 6 depicts a comparison of bit distributions for pair 1 and pair 2 before and after noise decorrelation. As illustrated in FIG. 6, the bit distribution of pair 1, indicated at 210, is unchanged since pair 1 is unaffected by the noise decorrelation algorithm. The curve 212 shows a bit distribution for pair 2 before decorrelation and the curve 214 illustrates the bit distribution after noise decorrelation. From FIG. 6, it is shown that pair 2 is capable of transmitting more bits per tone after noise decorrelation as a result of the higher receiver SNR.

FIG. 7 illustrates data rate-reach curves 220, 222 and 226 for the two pairs (e.g., pair 1 and pair 2) for downstream data transmission for loops ranging from about 1 km to about 4 km. Also depicted are the sum rate-reach curves 224 and 228 for the receiver coordinated system that includes the same two pairs. In FIG. 7, the curves 220 and 222 represent downstream data rates for pair 1 and pair 2 before noise decorrelation and curve 224 represents the sum rate-reach for the system before (or in the absence of implementing) noise decorrelation. The curve 226 represents the downstream data rate for pair two after decorrelation, and curve 228 represents sum data rates after performing noise decorrelation according to an aspect of the present invention. As expected, the rate-reach curve 220 of pair 1 is the same before and after noise decorrelation. The rate increase of pair 2 is significant over almost all loop lengths. In the shortest loops (e.g., less than about 1.5 km), the improvements become smaller mainly because of the cap on the number of bits that can be transported on each tone. It will be appreciated that similar performance gains are expected over a wide range of loops with other NEXT interferers that affect a significant portion of the downstream or upstream band. For FEXT interferers (e.g., FEXT from a similar system), the gains are considerable primarily in short enough loops, where FEXT is the dominant noise source.

From Eq. 9, the alien crosstalk for user i can be defined as follows:

$$A_i = \sum_{k=1}^{M} A_{i,k} \quad \text{Eq. 10}$$

$$= \sum_{k=1}^{M} Q A_{i,k}^c z_k^p \quad \text{Eq. 11}$$

With the assumption that crosstalk sources are independent, the correlation matrix of alien crosstalk of user i ($R_{A_iA_i}$) can be represented as follows:

$$R_{A_iA_i} = \sum_{k=1}^{M} Q A_{i,k}^c E(z_k^p z_k^{p*}) A_{i,k}^{c*} Q^*, \quad \text{Eq. 12}$$

while the cross-correlation matrix of alien crosstalk of user i with that of user j ($R_{A_iA_j}$) is:

$$R_{A_iA_j} = \sum_{k=1}^{M} Q A_{i,k}^c E(z_k^p z_k^{p*}) A_{j,k}^{c*} Q^*, \quad \text{Eq. 13}$$

By way of further example, those skilled in the art will appreciate that the benefits associated with implementing noise decorrelation, as described herein, are demonstratable for a special case in which: $\xi = v$, and $z_{N-k} = z_{-k}$, for $k=1, \ldots, v$, results in the following relationship:

$$z_k^p = P z_k, \quad \text{Eq. 14}$$

where P is as in Eq. 4 with $\mu_i = 0$.

These conditions correspond to the special case where the alien crosstalk sources correspond to DMT transmitters with the same sampling rates, same block sizes, and same CP and CS as the vectored system. Also, the transmission of the alien crosstalk sources are such that the DMT symbol boundaries are synchronized with the received DMT symbols of the vectored system, such as described herein (e.g., employing CS for synchronization). While these assumptions may not closely represent a practical situation, such assumptions do help provide intuitive insight that is easily adapted to practice.

Continuing with the above illustrative assumptions and further assuming that the transmitted samples of the alien crosstalk are white, it is $E(z_k z_k^*) = \xi_{z,k} I$. Those skilled in the art will appreciate that any transmitter spectrum shaping of the alien crosstalk sources can be incorporated in the alien crosstalk coupling. The cross-correlation matrix of the alien crosstalk of user i with that of user j from Eq. 13 becomes:

$$R_{A_iA_j} = \sum_{k=1}^{M} Q A_{i,k}^c P E(z_k z_k^*) P^* A_{j,k}^{c*} Q^* \quad \text{Eq. 15}$$

$$= \sum_{k=1}^{M} Q A_{i,k} E(z_k z_k^*) A_{j,k}^* Q^* \quad \text{Eq. 16}$$

$$= \sum_{k=1}^{M} \varepsilon_{z,k} \Lambda_{i,k}^A \Lambda_{j,k}^* \quad \text{Eq. 17}$$

where $\Lambda_{i,k}^A = Q A_{i,k} Q^*$ is a diagonal matrix.

This expression shows that for this special case, noise correlation exists only when the same tone is examined for different users. In other words, there is no cross-correlation between noise of different users when that noise corresponds to different tones. When the above special case does not hold, noise on some tone of one user may be correlated with noise on another different tone of a second user. This is attributed to the effect of FFT-spreading, and it is known that it can be controlled through appropriate receiver windowing. That is, the predetermined cross-correlation matrix (see, e.g., Eq. 1) can be determined to describe a cross-correlation of crosstalk interference between first and second lines for each same tone of the plurality of tones.

By way of yet further example, under more practical circumstances, the above-described cross-correlation of crosstalk interference will be better appreciated with respect to FIGS. 8-11. For the examples shown and described with respect to FIGS. 8-11, it is assumed that there is a single crosstalk source from a T1 transmitter, which affects the downstream receivers of 2 ADSL2+ systems. Other noise sources (e.g. background noise) are here ignored for purposes of simplicity of explanation. The bandwidth of the ADSL2+ system is 2.208 MHz, where 512 tones with a 4.3125 kHz spacing are used.

Figure 8:
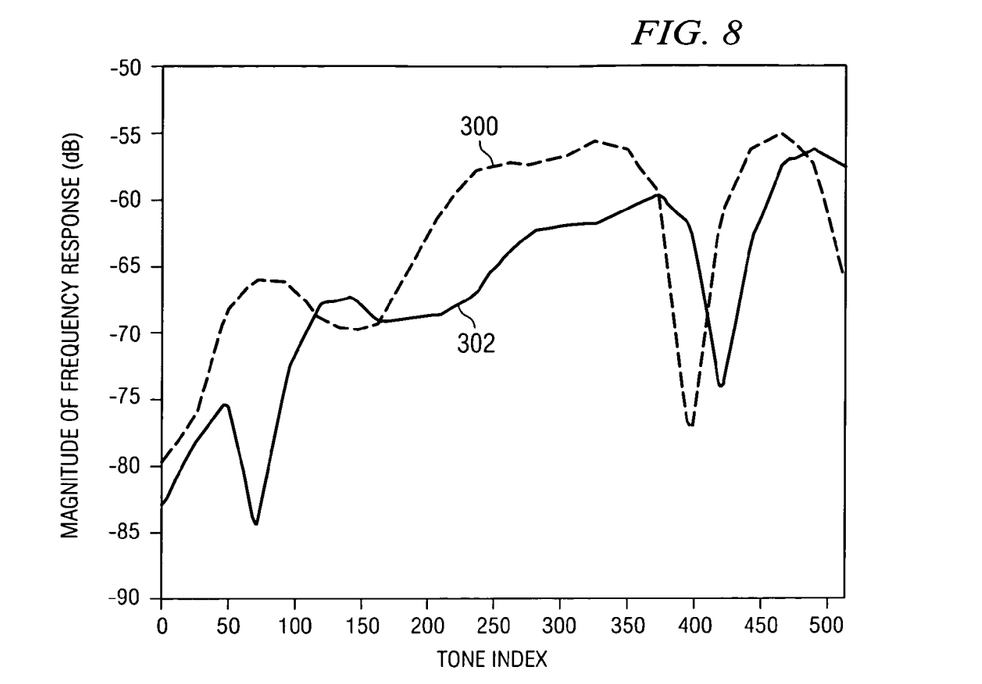
FIG. 8 depicts a comparison of crosstalk coupling for a pair of lines.

It is further assumed that the ADSL2+ receivers are affected by NEXT interference originating from the T1 transmitter, which can be measured. In this example, two sets of coupling measurements are utilized, with set of measurements representing the coupling between pairs 2 and 6, and the other set representing the coupling between pairs 2 and 11 within a single bundle. In what follows, it is assumed that set 1 expresses the coupling between the crosstalk source and vectored pair 1, while set 2 expresses the coupling between the crosstalk source and vectored pair 2. FIG. 8 depicts the magnitude of the NEXT crosstalk coupling for pair 1 (indicated at 300) and for pair 2 (indicated at 302).

For the numerical computations that follow, Eqs. 12 and 13 are used. The elements of $A_{i,k}^c$ can be ascertained from frequency responses of the crosstalk coupling that have been converted to impulse responses and shortened (e.g., capturing about 99.9% of the impulse energy). The $E(z_k^P z_k^{P*})$ correlation matrix can be derived by computing the correlation of the transmitted samples of the crosstalk source. For this computation, the transmit spectrum shaping can be modeled (e.g., through an FIR filter with a plurality of samples (>50 samples).

Figure 9:
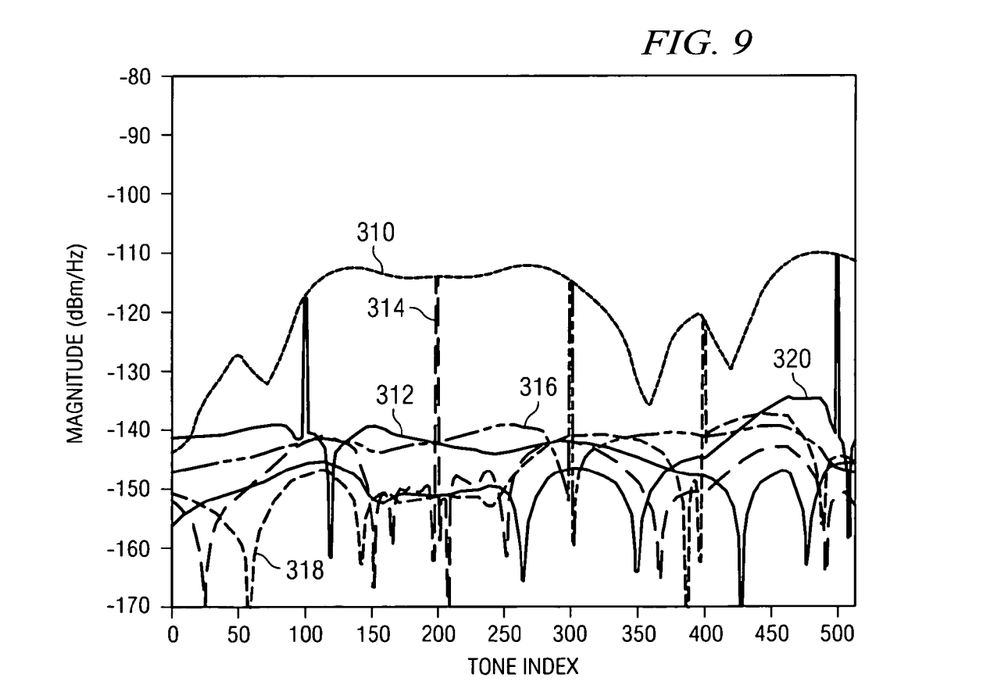
FIG. 9 depicts an example of noise variance and noise correlation across a plurality of tones for a first user.

FIG. 9 illustrates curves 310, representing the magnitude of the noise variance of pair 1 (indicated at 310), and five other magnitude curves 312, 314, 316, 318 and 320 that represent the correlation between noise on a specific tone and other tones of pair 1. In the five curves 312, 314, 316, 318 and 320, the reference tones are chosen to be tone 100, 200, 300, 400 and 500, respectively. The correlation curves 312, 314, 316, 318 and 320 thus exhibit strong correlation at the point where they coincide with the noise variance curve 310. Additionally, it can be observed that the noise among the different tones exhibits relatively weak correlation.

Figure 10:
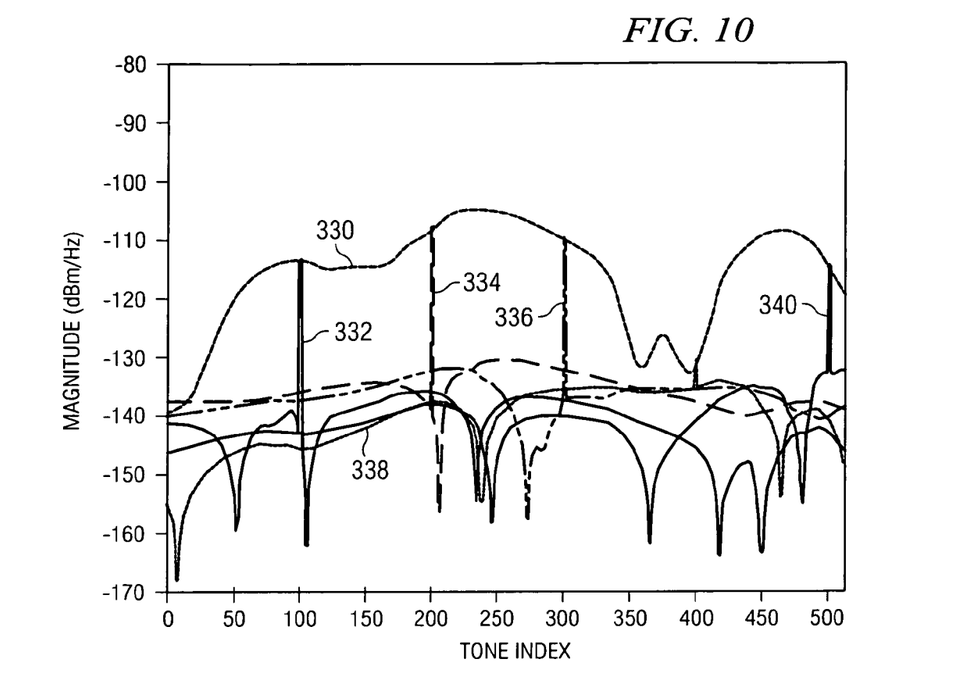
FIG. 10 depicts an example of noise variance and noise correlation across a plurality of tones for a second line.

FIG. 10 shows similar noise variance and correlation curves corresponding to pair 2. As depicted in FIG. 10, the curves 330 representing the magnitude of the noise variance of pair 2, and other magnitude curves 332, 334, 336, 338 and 340 represent the correlation between noise on a specific tone and other tones of pair 2. In the five curves 332, 334, 336, 338 and 340, the reference tones are chosen to be tone 100, 200, 300, 400 and 500, respectively. Again, as in the example of FIG. 9, it is observed that noise correlation between tones is relatively weak.

Figure 11:
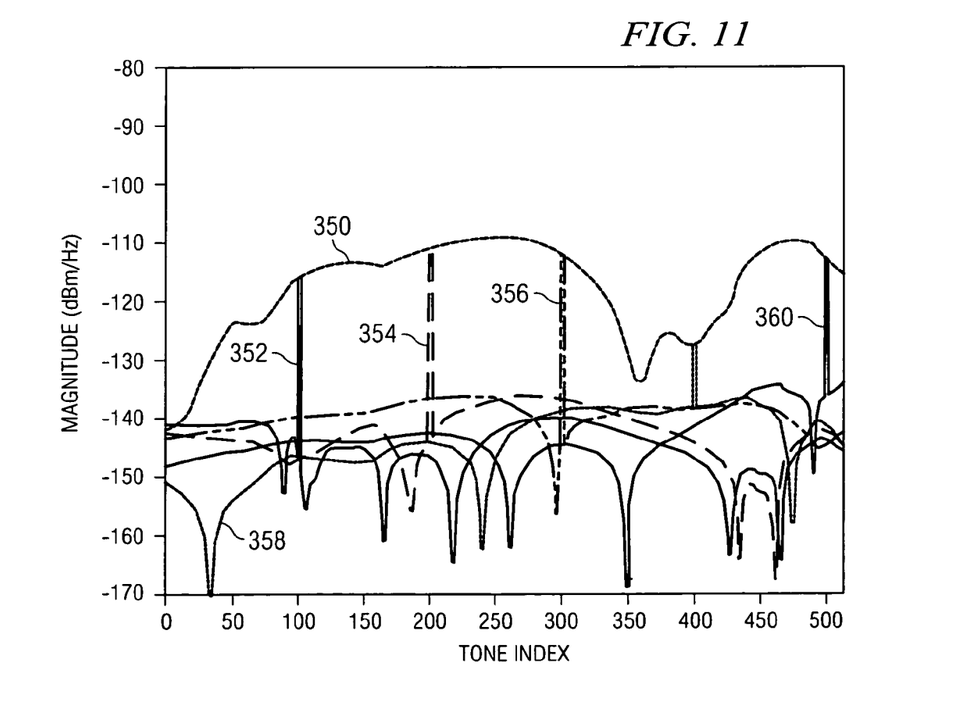
FIG. 11 depicts an example of noise cross-correlation between a pair of lines.

FIG. 11 depicts a comparison plot of cross-correlated noise magnitudes for first and second users (pair 1 and pair 2). In the example of FIG. 11, a curve 350 represents the magnitude of the correlation between noise of pair 1 and of pair 2 for the same tone over a range of tones. The other curves 352, 354, 356, 358 and 360 represents the magnitude of the correlation between noise on a specific tone of pair 1 and noise on a range of tones of pair 2. For the curves 352, 354, 356, 358 and 360 where a specific tone of pair 1 is used as a reference, the tone index is chosen as 100, 200, 300, 400 and 500, respectively. From FIG. 11 it becomes apparent that the correlation between pairs 1 and 2 for the same tone is significant and comparable to the noise variances of the two pairs. It also demonstrates that the correlation between different tones of different pairs is relatively weak. As a result, the approach described herein can exploit the existence of noise correlation between pairs within the same tone.

In view of the demonstrative examples for cross-correlation and the foregoing example architectures and functional features associated with implementing receiver coordinated noise prediction and decorrelation, the basis for implementing such features will be better appreciated with respect to the following mathematical analysis. For convenience, EQ. 9 is restated here as follows:

$$Y_i = \Lambda_i X_i = N'_i + A_i.$$  Eq. 9

In the above Eq. 9, the received frequency-domain samples of user i are given, where vector samples correspond to different tones, and i=1, . . . L. Since $\Lambda_i$ is a diagonal matrix, the expression of Eq. 9 can also be given as:

$$Y_{i,n} = \Lambda_{i,n} X_{i,n} + N'_{i,n} + A_{i,n}$$  Eq. 18 where n=1, . . . , N is the tone index, and where $Y_i=[Y_{i,1} \ldots Y_{i,N}]^T$, $X_i=[X_{i,1} \ldots X_{i,N}]^T$, $N'_i=[N'_{i,1} \ldots N'_{i,N}]^T$, $A_i=[A_{i,1} \ldots A_{i,N}]^T$ and $\Lambda_{i,n}$ are the diagonal elements of $\Lambda_i$. Reorganizing Eq. 18 into vectors corresponding to a specific tone, the following expression can be obtained:

$$Z_n = T_n W_n + N_n, \text{ for } n=1, \ldots, N$$  Eq. 19 where $Z_n=[Y_{1,n} \ldots Y_{L,n}]^T$, $W_n=[X_{1,n} \ldots X_{L,n}]^T$ and $N_n=[N_{1,n} \ldots N_{L,n}]^T$. Also, $T_n$ is a diagonal matrix with elements $\Lambda_{1,n}, \ldots, \Lambda_{L,n}$.

The term $N_n$ includes noise components corresponding to both background noise, $N'_{i,n}$, and alien crosstalk, $A_{i,n}$. In the expression above, $R_{N_n N_n}$ is in general non-diagonal.

As shown and described herein (e.g., FIGS. 2 and 3), the receiver noise can be directly decorrelated by estimating and subtracting the error of the decoder. For instance, from Eq. 19, the noise vector is expressed as follows:

$$N_n = G_n E_n$$  Eq. 20 where $E_n$ is called the innovations vector and $G_n$ is the cross-correlation matrix as described with respect to Eq. 1 herein.

The lower-triangular property of the $G_n$ matrix naturally leads to the following noise decorrelation procedure. First, $N_{n,1}=E_{n,1}$, which is easily found by subtracting the decoder output of pair 1 from the decoder input of pair 1, such as described above with respect to FIGS. 1 and 2. Then, for pair to the noise can be represented as follows:

$$N_{n,2} = E_{n,2} + g_n^{(2,1)} E_{n,1} \Leftrightarrow$$  Eq. 21

$$E_{n,2} = N_{n,2} - g_n^{(2,1)} E_{n,1}$$  Eq. 22 where $g_n^{(2,1)}$ is the element of $G_n$ at row 2 and column 1

From the above, it can be noted that the noise term of pair 2 can be decorrelated by subtracting the cross-correlated noise estimate $g_n^{(2,1)} E_{n,1}$ from the received signal of pair 2. Then, the noise estimate for line 2, $E_{n,2}$ can be determined by subtracting the decoder output of pair 2 from the decoder input of pair 2. This process can continue for the remaining pairs in the receiver coordinated system, where in each iteration the previously estimated errors $E_{n,1}, \ldots, E_{n,k-1}$ are weighted to provide a corresponding indication of the cross-correlated noise between the next pair and each of the preceding pairs. The cross-correlated noise terms that is subtracted from the received signal of k.

Starting with Eq. 19, the noise-prediction operation is expressed as follows:

$$\tilde{Z}_n = Z_n = (I - G_n)E_n \qquad \text{Eq. 23}$$

$$= T_n W_n + N_n + (I - G_n)E_n \qquad \text{Eq. 24}$$

$$= T_n W_n + E_n, \qquad \text{Eq. 25}$$

where it is seen that the resulting noise is uncorrelated, and $T_n$ is a diagonal matrix with elements $\Lambda_{1,n}, \ldots, \Lambda_{L,n}$ (see, e.g., Eq. 19) and $E_n$ is the error estimate matrix for the block of n DMT tones of a given pair.

From the foregoing, those skilled in the art will understand and appreciate that an interesting advantage of this scheme is the lack of the feed-forward section. As described above with respect to FIG. 3, there are several possibilities for the computation of the error $E_n$. A DSL decoder can comprise multiple stages (e.g., slicer, Trellis decoder, RS decoder and the like), and the error $E_n$ can be computed based on the output of any of these stages. The typical DSL decoder includes an inner decoder (e.g., trellis decoder) and an outer decoder (e.g., Reed-Solomon decoder). The error can be found by comparing the symbols at the decoder input with the estimated symbols corresponding to either the outer or the inner decoder. The error can even be estimated by obtaining a decision through a "slicer" operation, such as described herein.

With reference back to FIG. 2 and the notation used therein, it can be demonstrated that the mutual information I between input $W_n$ and output $Z_n$ can be computed as follows:

$$I(W_n; Z_n) = I(W_n; \tilde{Z}_n) \qquad \text{Eq. 26}$$

This implies that the noise-prediction scheme described herein can be implemented with substantially no information loss compared to the original channel. It further can be shown that a simple expression for the mutual information based on Eq. 25 is as follows:

$$I(W_n; \tilde{Z}) = \frac{1}{2}\left(\frac{|T_n R_{W_n W_n} T_n^* + R_{E_n E_n}|}{|R_{E_n E_n}|}\right) \qquad \text{Eq. 27}$$

$$\leq \sum_{k=1}^{L} \frac{1}{2} \log_2\left(1 + \frac{|\tau_{n,k}|^2 \varepsilon_{n,k}}{\sigma_{n,k}^2}\right) \qquad \text{Eq. 28}$$

where $\tau_{n,k}$ are the diagonal elements of $T_n$, $\epsilon_{n,k}$ are the diagonal elements of $R_{W_n W_n}$, and $\sigma_{n,k}^2$ are the diagonal elements of $R_{E_n E_n}$. The inequality relation follows from Hadamard's inequality, and equality holds when the off diagonal elements of $R_{W_n W_n}$ equal 0. Thus, the maximization of the sum capacity can be achieved by solving the power allocation problem on parallel channels.

For the purpose of gaining further intuition, an alternative approach is here used to arrive at Eq. 28. Using the chain rule, the mutual information $i(W_n; Z_n)$ of the channel is expressed as:

$$I(W_n; Z_n) = \sum_{k=1}^{L} I(W_{n,k}; Z_n | W_{n,1}, \ldots, W_{n,k-1}) \qquad \text{Eq. 29}$$

A second use of the chain rule on each individual term of the above summation in Eq. 29 yields the following:

$$I(W_{n,k}; Z_n | W_{n,1}, \ldots, W_{n,k-1}) = \qquad \text{Eq. 30}$$

$$\sum_{m=1}^{L} I(W_{n,k}; Z_{n,m} | W_{n,1}, \ldots, W_{n,k-1}, Z_{n,1}, \ldots, Z_{n,m-1})$$

The terms of this sum can be individually investigated, such that for m<k, the mutual information expands to:

$$I(W_{n,k}; Z_{n,m} | W_{n,1}, \ldots, W_{n,k-1}, Z_{n,1}, \ldots Z_{n,m-1}) = \qquad \text{Eq. 31}$$

$$= H(Z_{n,m} | W_{n,1}, \ldots, W_{n,k-1}, Z_{n,1}, \ldots, Z_{n,m-1}) - \qquad \text{Eq. 32}$$
$$H(Z_{n,m} | W_{n,1}, \ldots, W_{n,k}, Z_{n,1}, \ldots, Z_{n,m-1})$$

$$= H(E_{n,m} | W_{n,1}, \ldots, W_{n,k-1}, Z_{n,1}, \ldots, Z_{n,m-1}) - \qquad \text{Eq. 33}$$
$$H(E_{n,m} | W_{n,1}, \ldots, W_{n,k-1}, W_{n,k}, Z_{n,1}, \ldots, Z_{n,m-1})$$

$$= 0$$

where Eq. 33 follows from the fact that $E_{n,m}$ is the only variable term of $Z_{n,m}$ given the conditions, and that Eq. 33 equal zero holds because the conditioning on $W_{n,k}$ provides substantially no additional information about $E_{n,m}$. Additionally, for m>k, the mutual information of Eq. 29 can be provided as follows:

$$I(W_{n,k}; Z_{n,m} | W_{n,1}, \ldots, W_{n,k-1}, Z_{n,1}, \ldots, Z_{n,m-1}) = \qquad \text{Eq. 34}$$

$$= H(W_{n,k} | W_{n,1}, \ldots, W_{n,k-1}, Z_{n,1}, \ldots, Z_{n,m-1}) - \qquad \text{Eq. 35}$$
$$H(W_{n,k} | W_{n,1}, \ldots, W_{n,k-1}, W_{n,k}, Z_{n,1}, \ldots, Z_{n,m-1} Z_{n,m})$$

$$= 0$$

where Eq. 35 equals zero because the conditioning on $Z_{n,m}$ offers no additional information on $W_{n,k}$. For the final case where m=k, the mutual information of Eq. 29 provides the following expansion:

$$I(W_{n,k}; Z_{n,k} | W_{n,1}, \ldots, W_{n,k-1}, Z_{n,1}, \ldots Z_{n,k-1}) = \qquad \text{Eq. 36}$$

$$= I\left(W_{n,k}; Z_{n,k} - \sum_{m=1}^{k-1} f_n^{(k,m)} E_{n,m} \,\middle|\, W_{n,1}, \ldots, W_{n,k-1}, Z_{n,1}, \ldots, Z_{n,k-1}\right) \qquad \text{Eq. 37}$$

$$= I(W_{n,k}; \tilde{Z}_{n,k}) \qquad \text{Eq. 38}$$

where $f_n^{(k,m)}$ is the element of $F_n$ on row k and column m, and Eq. 37 follows from the fact that the conditioning fully determines $E_{n,m}$ for m=1, . . . , k−1. Thus, from the foregoing, it can be determined that:

$$(I(W_n; Z_n) = \sum_{k=1}^{L} I(W_{n,k}; \tilde{Z}_{n,k}) \qquad \text{Eq. 39}$$

$$\leq \sum_{k=1}^{L} \frac{1}{2} \log_2 \left( 1 + \frac{|\tau_{n,k}^2| \varepsilon_{n,k}}{\sigma_{n,k}^2} \right) \qquad \text{Eq. 40}$$

Those skilled in the art will understand and appreciate that different decoding orders can be used in a receiver coordinated system without departing from the spirit and scope of the present invention. For example, it can be observed that changing the decoding order is equivalent to pre-multiplying $W_n$ and $Z_n$ by a permutation matrix. That is, while a change in the order of decoding may change the values of $\tau_{n,k}$ and an $\sigma_{n,k}$; however, it is easy to see that the mutual information as defined herein above is not affected. This implies that the decoding order affects the data rate of each pair but not the highest possible sum data rate for the multi-pair system. Accordingly, the order in which a given pair is decoded and noise estimates are obtained can vary without affecting the resulting benefits associated with implementing noise decorrelation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, while the systems and methods herein have generally been described in the context of DMT transmission, the approaches described herein can be applied to various other types of transmission methods. Accordingly, the present invention is intended to embrace all such alterations, modifications, and variations that fall within the spirit and scope of the appended claims.

What is claimed is:

1. A receiver coordinated system to reduce crosstalk interference, comprising:
   an error estimator that estimates noise for a first line of a plurality lines and provides an error estimate for the first line;
   a noise predictor that applies a predetermined cross-correlation value to the error estimate to provide a correlated noise term that describes noise cross-correlation between the first line and a second line of the plurality of lines; and
   a noise decorrelation component that applies the cross-correlated noise term to substantially decorrelate noise for the second line.

2. The system of claim 1, wherein the noise decorrelation component applies a respective predetermined cross-correlation value for each of a plurality of tones to a frequency domain input received via the second line for reducing cross-correlated noise for the second line.

3. The system of claim 1, wherein the predetermined cross-correlation value describes a cross-correlation of crosstalk interference between the first line and the second line for each same tone of the plurality of tones.

4. The system of claim 1, further comprising a decoder system for the first line that employs at least one stage of decoding to decode a frequency domain decoder input and to provide a corresponding decoder output, the error estimator computing the error estimate for the first line as a function of the decoder output and the decoder input for at least a substantial portion of a plurality of tones, the error estimate being provided to the noise decorrelation component for performing noise decorrelation for the second line in the receiver coordinated system.

5. The system of claim 4, wherein one of the decoder output and the decoder input are scaled to facilitate computing the error estimate.

6. The system of claim 1, wherein a receiver for the first line comprises:
   a slicer that computes decisions for input data symbols in an input received via the first line and provides a corresponding slicer output in the frequency domain; and
   a decoder system for the first line that employs at least one stage of decoding to decode the slicer output and to provide a corresponding decoder output;
   wherein the error estimator determines the error estimate for at least a substantial portion of a plurality of tones as a function of at least one of the slicer output and the decoder output.

7. The system of claim 6, wherein the slicer and the decoder system define multiple levels of decoding for the receiver of the first line, the receiver coordinated system further comprising a selector that is configured to select at least one of the multiple levels of decoding to be employed by the error estimator to compute the error estimate for each of a plurality of tones.

8. The system of claim 1, wherein each block of data received via the first line and via the second line are synchronized relative to each other.

9. The system of claim 1, wherein the predetermined cross-correlation value comprises a cross-correlation weight value determined for each of a plurality of tones transmitted during training over the first line and the second line.

10. The system of claim 1, wherein the error estimator is a first error estimator for the first line and the noise predictor is a first noise predictor, the receiver coordinated system further comprising:
    a second error estimator that estimates noise for the second line and provides an error estimate for the second line;
    a second noise predictor that applies a second predetermined cross-correlation value for a plurality of tones to the error estimate for the first line to provide a second correlated noise term that describes noise cross-correlation between the first line and at least one other line of the plurality of lines;
    a third noise predictor that applies a third predetermined cross-correlation value for the plurality of tones to the error estimate for the second line to provide a third correlated noise term that describes noise cross-correlation between the second line and the at least one other line of the plurality of lines; and
    a noise decorrelation component that applies the second correlated noise term and the third cross-correlated noise term to substantially decorrelate noise for the at least one other line.

11. The system of claim 1, wherein each of the plurality of lines of the receiver coordinated system comprises a twisted-pair of an electrically conductive material in a bundled digital subscriber line system.

12. A receiver coordinated system to reduce crosstalk interference in a multi-pair digital subscriber line system, comprising:
 a first receiver associated with a first twisted-pair line, the first receiver comprising:
  a decoder that decodes a frequency domain input signal received via the first line and provides a corresponding decoded signal;
  an error estimator that determines a noise estimate for the first line based on the input signal and the decoded signal; and
  a noise predictor that computes an indication of cross-correlated noise between the first line and at least a second line as a function of the noise estimate for at least a substantial portion of a plurality of tones;
 at least a second receiver, which is co-located with the first receiver and associated with a second twisted-pair line, decorrelates cross-correlated interference on the second line as a function of the indication of cross-correlated noise between the first line and the second line.

13. The system of claim 12, wherein the second receiver further comprises a noise correlation component that applies a respective predetermined cross-correlation value for each of the plurality of tones to a frequency domain input received via the second line to mitigate cross-correlated noise on the second line.

14. The system of claim 12, wherein the first receiver further comprises a slicer that computes decisions for input data symbols and provides corresponding slicer output to the decoder of the first receiver, the error estimator of the first receiver computing the noise estimate for the first line for at least a substantial portion of the plurality of tones as a function of at least one of the slicer output and the decoder output.

15. The system of claim 14, wherein slicer and the decoder system define multiple levels of decoding for the first receiver, the first receiver further comprising a selector that is configured to select which at least one of the multiple levels of decoding is employed by the error estimator to compute the noise estimate for the first line.

16. The system of claim 12, wherein the first receiver further comprises a scaling component that applies a predetermined scaling factor to one of the input signal and the decoded signal so that decoded signal and the input signal are scaled to facilitate computing the error estimate.

17. The system of claim 12, wherein the noise predictor computes the indication of cross-correlated noise between the first line and the at least a second line as a function of a predetermined cross-correlation weight value ascertained for each of the plurality of tones during training.

18. The system of claim 17, wherein the predetermined cross-correlation weight value describes a cross-correlation of crosstalk interference between the first line and the second line for each same tone of the plurality of tones.

19. A receiver coordinated system to reduce crosstalk interference in a multi-pair digital subscriber line system, comprising:
 means for providing an estimate of noise for a first line of a plurality of lines based on a frequency domain input signal and a corresponding decoded output signal for the first line;
 means for predicting a cross-correlated noise term for the first line and a second of the plurality of lines as a function of the estimate of noise for the first line and a predetermined cross-correlation parameter that describes a cross-correlation of interference between the first line and the second line for a set of the same respective tones; and
 means for decorrelating noise on the second line based on the predicted cross-correlated noise term to provide a corresponding decorrelated input signal for the second line.

20. The system of claim 19, further comprising:
 means for decoding the decorrelated input signal for the second line and for providing a corresponding decoded signal for the second line;
 means for providing an estimate of noise for the second line based on the decorrelated input signal for the second line and the corresponding decoded signal for the second line;
 means for predicting a cross-correlated noise term for the second line and at least another line of the plurality of lines as a function of the estimate of noise for the second line and another predetermined cross-correlation parameter that describes noise cross-correlation between the second line and the at least another line.

21. The system of claim 19, wherein the estimate of noise for the first line is computed for each of a plurality of tones in a discrete multi-tone block, a respective cross-correlated noise term being computed for each same tone of the plurality tones by the means for predicting.

* * * * *